A. E. HANSEN.
EXPANDER.
APPLICATION FILED JAN. 19, 1918.
1,346,957.
Patented July 20, 1920.
2 SHEETS—SHEET 1.
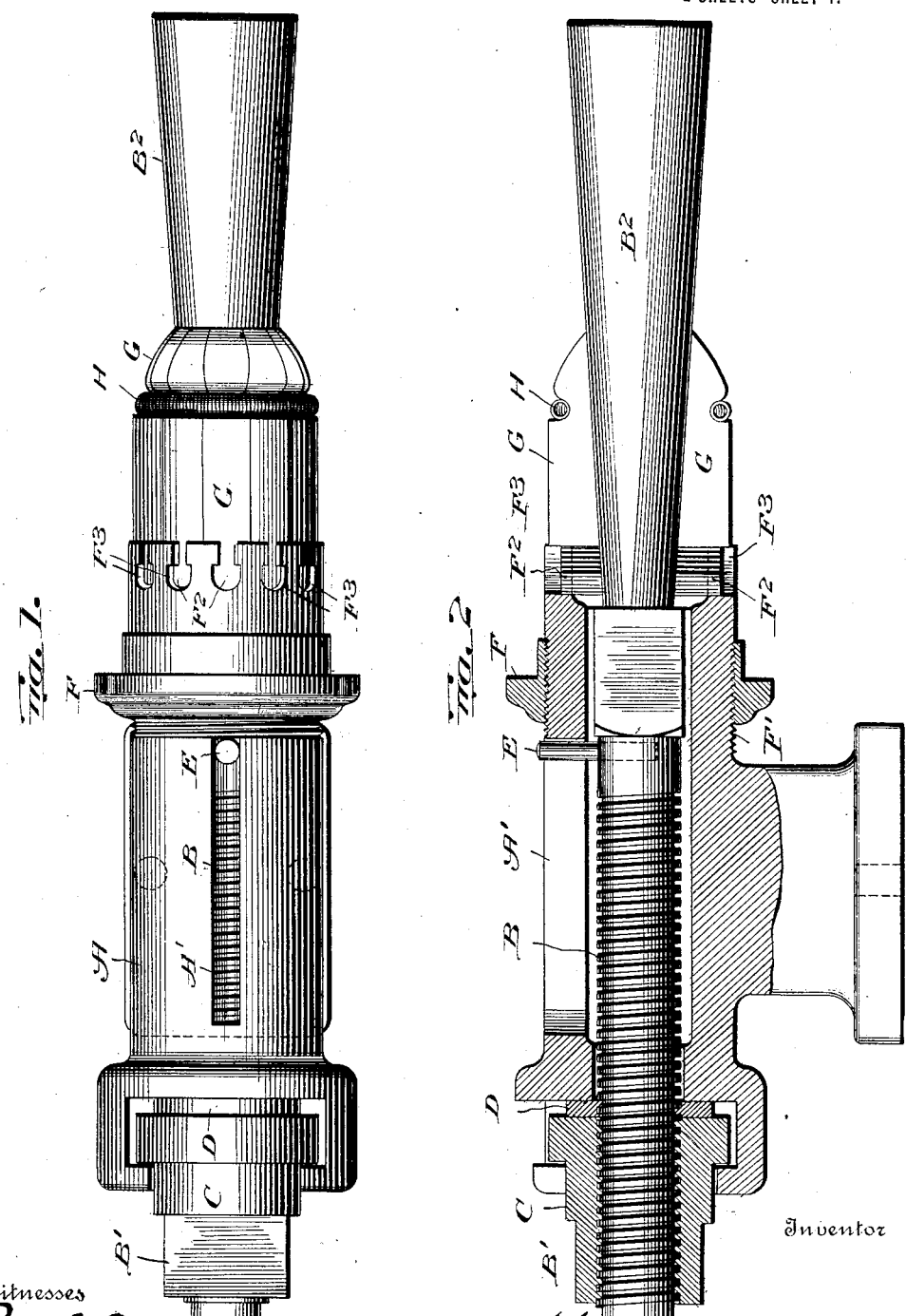

A. E. HANSEN.
EXPANDER.
APPLICATION FILED JAN. 19, 1918.

1,346,957. Patented July 20, 1920.
2 SHEETS—SHEET 2.

Witnesses
Philip E. Barnes

Inventor
Albert E. Hansen
By Louis Boegger
his Attorneys

UNITED STATES PATENT OFFICE.

ALBERT E. HANSEN, OF ELKHART, INDIANA.

EXPANDER.

1,346,957.

Specification of Letters Patent.

Patented July 20, 1920.

Application filed January 19, 1918. Serial No. 212,572.

*To all whom it may concern:*

Be it known that I, ALBERT E. HANSEN, a citizen of the United States of America, residing at Elkhart, in the county of Elkhart and State of Indiana, have invented certain new and useful Improvements in Expanders, of which the following is a specification.

My invention relates to an improvement in expanders, its purpose being for attaching expansion ring couplings to hose.

The special function of the expander is to expand a ring into the hose on the outside of which a coupling is placed and it embodies a number of novel features which will be specifically described in the specification and set forth in the claim of the patent.

In the accompanying drawings:

Figure 1 is a top plan view.

Fig. 2 is a longitudinal vertical section.

A, represents the body of the expander which is preferably made of casting of iron, steel or brass and includes a base and a horizontally disposed barrel portion.

B, indicates a screw on which is threaded a nut C having a square projection B' at one end to take a wrench by which it is turned and having a long tapering cone $B^2$, at the opposite end, the larger end of which projects well beyond the end of the machine.

Figure 3:
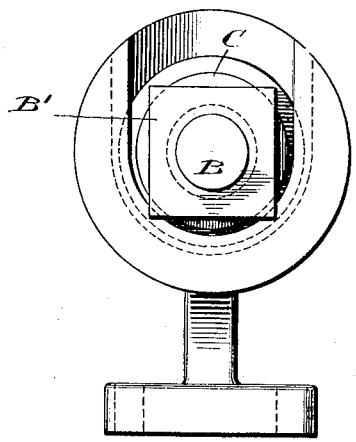
Figs. 3 and 4 are views from opposite ends of the expander.
Figure 4:
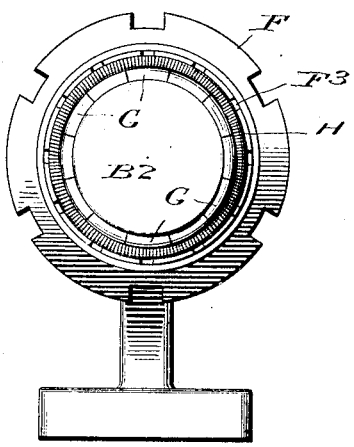
Figure 5:
Figs. 5, 6, 7 and 8 are different views of one of my improved segments.
Figure 7:
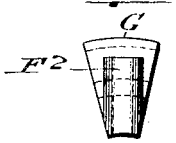
Figure 6:
Figure 8:

The nut C is preferably made of malleable iron, steel or brass and is constructed and adapted to fit in the open end of the body from the top as will be clearly understood by referring to Figs. 1, 2 and 3, where it is permitted to turn but held against end-wise movement, so that the turning of the nut causes the screw to move end-wise in one direction or the other. The brass washer D, is inserted between the body A, and the nut C, to lessen friction at that point where the pull upon the nut C, is the greatest in the expanding operation. The construction of the body portion A at this point where the nut C, and the washer D, are inserted gives to the screw B, a right and left movement whereas with other expanders now in use they screw up on the nut C expanding the segments in one direction but do not reverse.

A pin E, made preferably of steel is inserted through the elongated slot A' in the top of the machine into the screw B, its function being to limit the end-wise travel of the screw in either direction.

The adjusting nut F, screws on the threads F', of the body and provides the proper length for various lengths of couplings whereby they assume the proper relation with respect to the segments of the expander, this nut is preferably made of brass, steel or malleable iron. The adjustability of this nut gives any desired length and is a novel and improved feature of the present invention.

G, represents the segments of the expander. These, too, are made of malleable iron, brass or steel, and they are provided at one end with the arrow-head joint $F^2$, which is adapted to slip into the socket $F^3$, formed to receive them and they are fashioned interiorly to fit the cone taper $B^2$, of the screw B as shown in Fig. 2.

A spring H holds the segments yieldingly together or in contact with the cone taper end $B^2$. Other expanders have a round rubber band which is soon destroyed by oil used in the operation while this spring H, is practically indestructible. The design of the segments G, which travel on the cone taper end $B^2$, of the screw practically eliminates any breakage on the segments which heretofore has been a weak point in expanders.

I claim:

The combination with an expander body having an elongated slot extending lengthwise of the barrel portion thereof, a screw extending through the bore of the body threaded at one end and having a tapering cone at the other and provided with a pin extending radially therefrom into and movable through the elongated slot in the body, a nut into which the screw is threaded swiveled in an open recess in the body, segments surrounding the cone and held in yielding contact therewith and provided with arrow-heads, the body having radial sockets to receive and guide said arrow-heads as the segments are radially expanded by the end-wise movement of the screw and the cone therein, the body having externally threaded portion, and an adjusting nut adapted to be screwed upon said threads for adjustment for the various lengths of couplings.

In testimony whereof I affix my signature.

ALBERT E. HANSEN.